(12) United States Patent
Shida et al.

(10) Patent No.: US 7,773,686 B2
(45) Date of Patent: Aug. 10, 2010

(54) MIMO WIRELESS DATA TRANSMISSION SYSTEM

(75) Inventors: Masaaki Shida, Hachioji (JP);
Shigenori Hayase, Kodaira (JP);
Keisuke Yamamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 786 days.

(21) Appl. No.: 11/783,706

(22) Filed: Apr. 11, 2007

(65) Prior Publication Data
US 2008/0056140 A1 Mar. 6, 2008

(30) Foreign Application Priority Data
Aug. 31, 2006 (JP) .............................. 2006-234895

(51) Int. Cl.
*H04B 7/02* (2006.01)
*H04L 1/02* (2006.01)
(52) U.S. Cl. .................... 375/267; 375/299; 375/347; 370/334; 455/101
(58) Field of Classification Search ................ 375/267, 375/299, 347; 370/334; 455/101
See application file for complete search history.

(56) References Cited

U.S. PATENT DOCUMENTS

| | | | |
|---|---|---|---|
| 6,973,140 | B2 | 12/2005 | Hoffman et al. |
| 7,184,713 | B2 * | 2/2007 | Kadous et al. ............ 455/67.13 |
| 7,508,809 | B2 * | 3/2009 | Nagai et al. ................... 370/345 |
| 2003/0236080 | A1 | 12/2003 | Kadous et al. |
| 2005/0185733 | A1 * | 8/2005 | Tolli et al. .................... 375/285 |
| 2007/0274256 | A1 * | 11/2007 | Murai et al. ................ 370/328 |
| 2009/0046008 | A1 | 2/2009 | Murakami et al. |

FOREIGN PATENT DOCUMENTS

| | | |
|---|---|---|
| EP | 1298829 A1 | 4/2002 |
| EP | 1855408 A1 | 3/2006 |
| JP | 2002-528711 | 2/2000 |
| WO | WO 00/52831 A3 | 2/2000 |
| WO | WO 2006/075453 A1 | 11/2005 |

OTHER PUBLICATIONS

Foschini, Gerard J., "Layered Space-Time Architecture for Wireless Communication in a Fading Environment When Using Multi-Element Antennas", Bell Labs Technical Journal, Autumn 1996, pp. 41-59.
Andersen, Jorgen B., "Array Gain and Capacity for Known Random Channels with Multiple Element Arrays at Both Ends", IEEE Journal on Selected Areas in Communications, vol. 18, No. 11, Nov. 2000, pp. 2172-2178.
Xia, Pengfei, et al., "Adaptive MIMO-OFDM Based on Partial Channel State Information", IEEE Transactions on Signal Processing, vol. 52, No. 1, Jan. 2004, pp. 202-213.
Haitao Zheng et al., "Multiple ARQ Processes for MIMO Systems", EURASIP Journal on Applied Signal Processing, Hindawi Publishing Co., May 1, 2004, pp. 772-782.

* cited by examiner

*Primary Examiner*—Ted M Wang
(74) *Attorney, Agent, or Firm*—Stites & Harbison PLLC; Juan Carlos A. Marquez, Esq.

(57) ABSTRACT

A MIMO wireless data transmission system including a data arrangement in which data to be sent is divided for each transmission stream of MIMO with adding an error detection code thereto and thereby resending a subframe's worth of data when an error occurred at the time of resending. It therefore becomes to avoid the same frame being sent again at the time of resending.

15 Claims, 8 Drawing Sheets

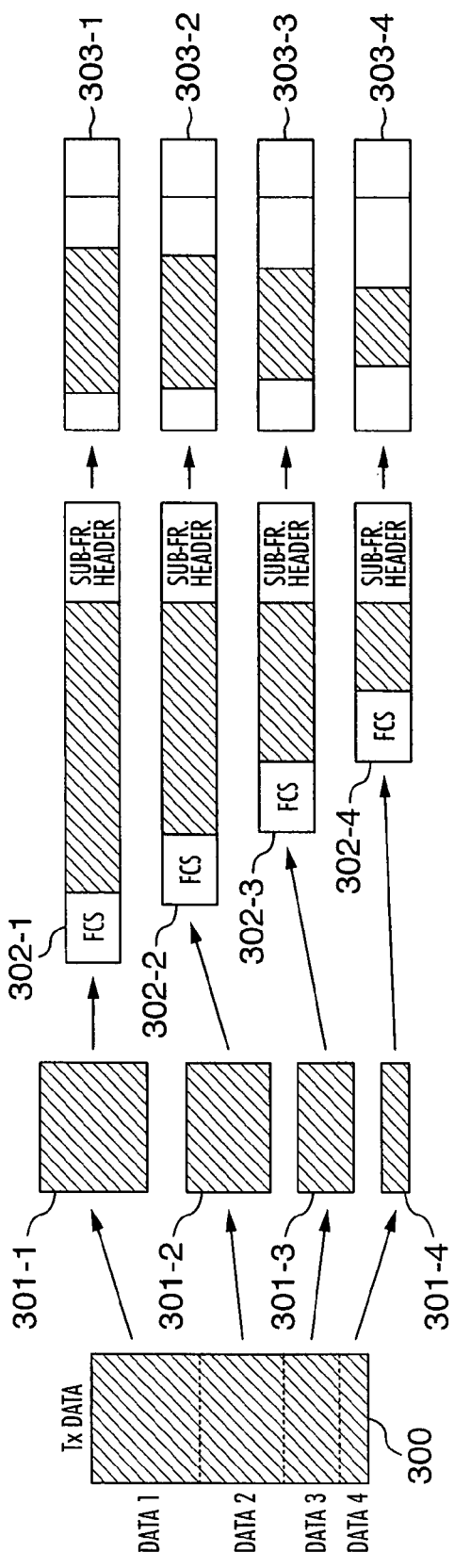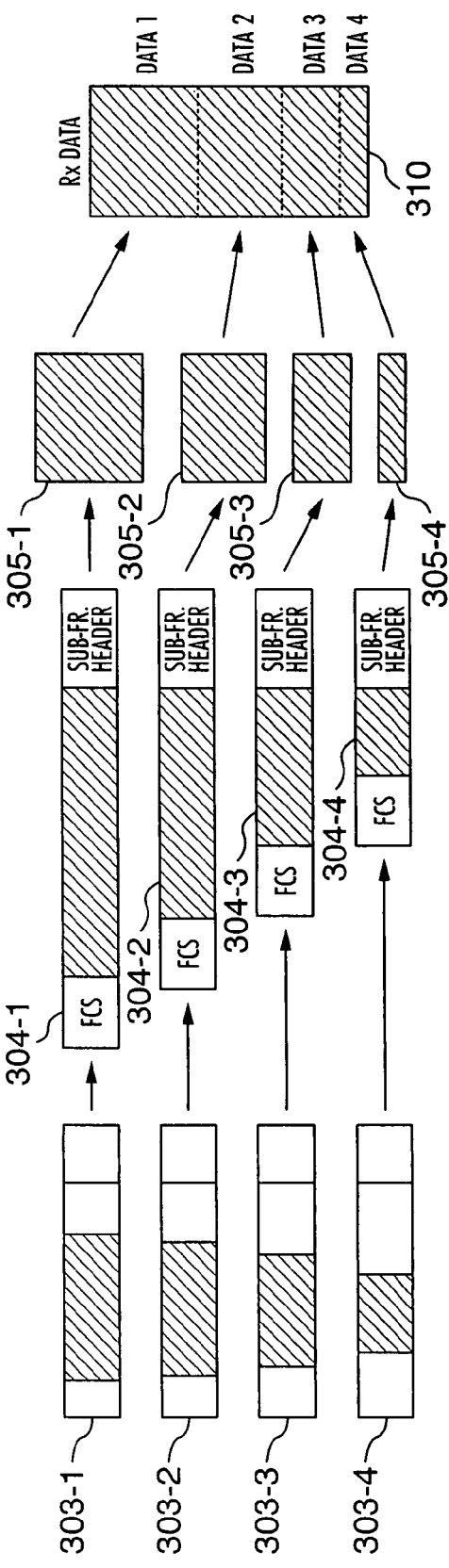

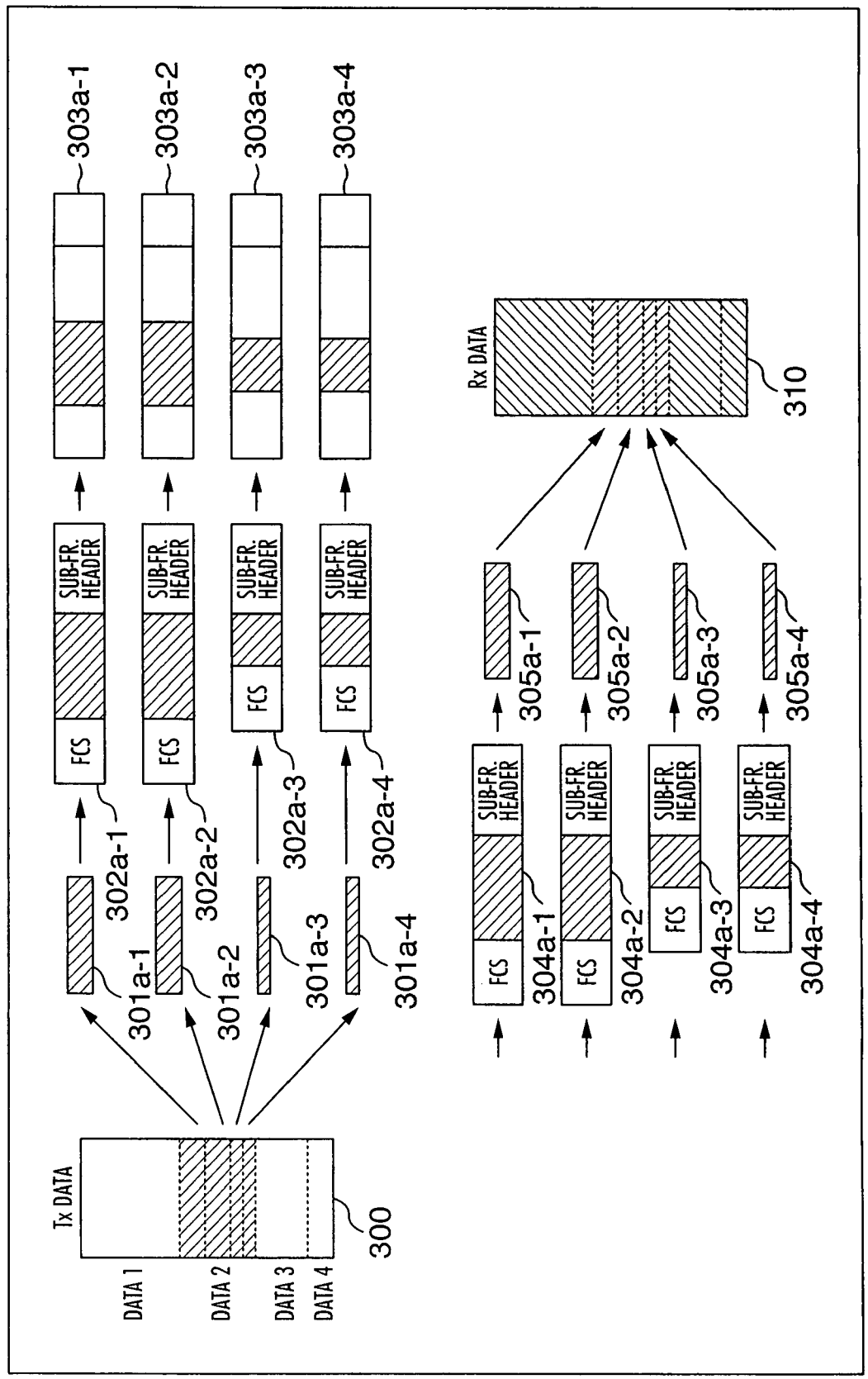

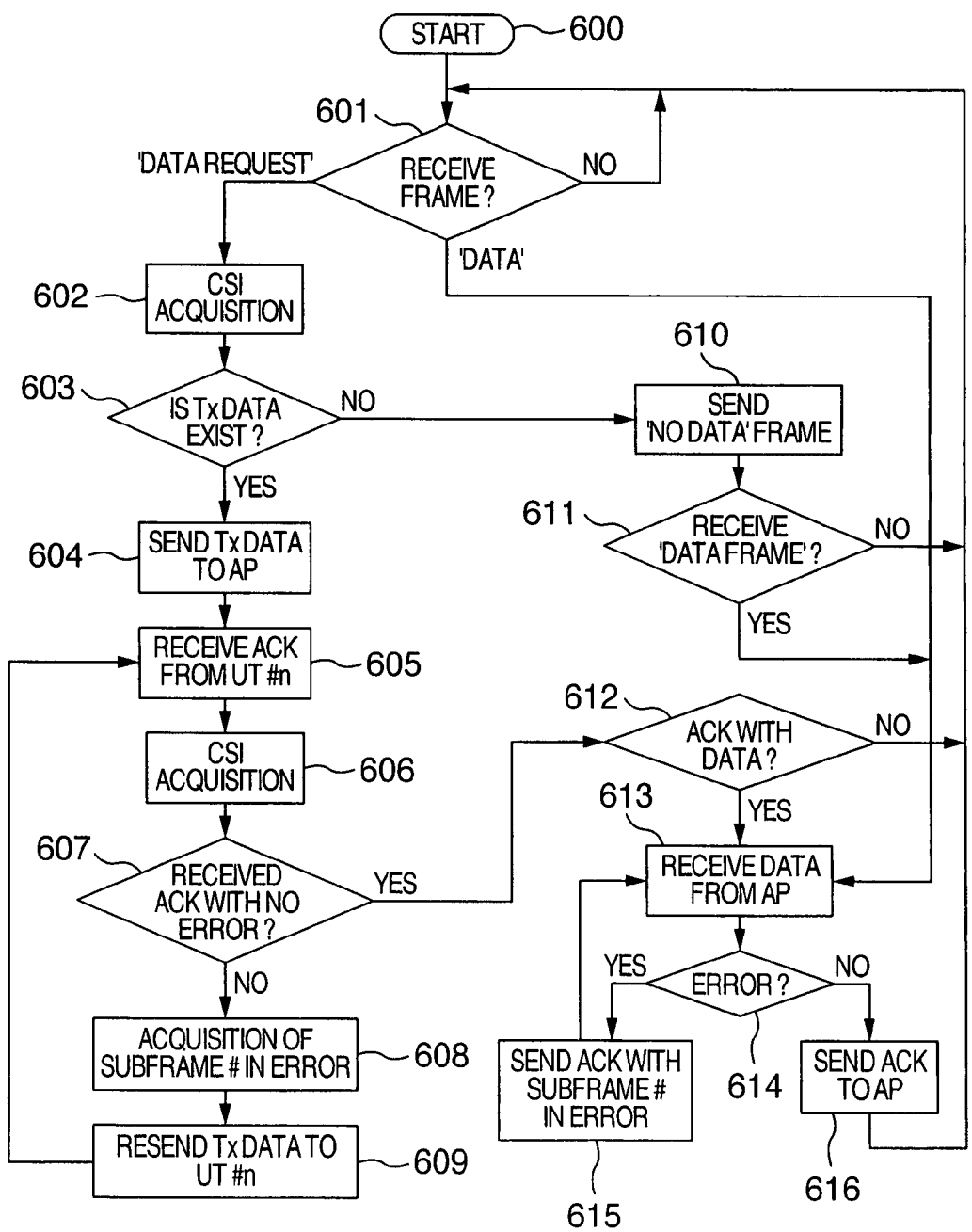

MIMO WIRELESS DATA TRANSMISSION SYSTEM

INCORPORATION BY REFERENCE

The present application claims priority from Japanese application JP2006-234895 filed on Aug. 31, 2006, the content of which is hereby incorporated by reference into this application.

BACKGROUND OF THE INVENTION

1. Field of the Invention

The present invention is directed to wireless devices that carry out data transmission using at least two or more antennas at each of the sending side and receiving side, and is directed to MIMO wireless transmission system including the above wireless device, and the present invention relates to the configuration of a wireless transmitter receiver suitable for the use environment in which high throughput is required, particularly in wireless transmission when the data size is large, such as in cases of video data and file transfer, and relates to the control method thereof.

2. Description of the Related Art

As the conventional MIMO wireless communication system, a technique to increase the data transmission capacity using a plurality of antennas is disclosed (see G. J. Foschini, "Layered Space-Time Architecture for Wireless Communication in a Fading Environment When Using Multi-Element Antennas," Bell Laboratories Technical Journal, Vol. 1, No. 2, pp. 41-59, Autumn, 1996). Moreover, there is disclosed a method called an eigen-mode transmission that transmits through one of MIMO transmissions a data on the basis of an eigen value, the eigen value being obtained by singular-value decomposing Channel State Information (CSI) of between transmission and receipt (see J. B. Andersen, "Array gain and capacity for known random channels with multiple element arrays at both ends," IEEE Journal on Selected Areas Communications, Vol. 18, No, 11, pp. 2127-2178, November 2000). Moreover, there is disclosed a method of determining a modulation method in MIMO-OFDM on the basis of CSI (see Pengfei Xia, Shengli Zhou, and Georgios B. Giannakis, "Adaptive MIMO-OFDM Based on Partial Channel State Information," IEEE Transactions On Signal Processing, Vol. 52, No. 1, January 2004). FIG. 2 shows the configuration of a conventional MIMO-OFDM wireless device. The MIMO-OFDM wireless device comprises MAC part 11, a baseband part 21, an RF part 30, and an antenna 40.

The MAC part comprises a transmit buffer 101, a Frame Check Sequence (FCS) adder 103, an FCS check part 106, a receive buffer 108, a CSI memory 105, and a MAC controller 104b, and carries out access control. At the time of sending, the MAC part adds an FCS to a data in the transmit buffer to output to the baseband part 21. At the time of receiving, the MAC part carries out error detection of a data outputted from the baseband part 21 and notifies this result to the MAC controller 104b.

The baseband part 21 comprises an encoder 201, a puncturing part 202, a parser 216 that divides a data into the number of MIMO streams, an interleaver 203, a modulator 204, a transmission MIMO processing part 205, an inverse FFT part 206, a guard-interval adder 207, a parallel-to-serial converter 208, a serial-to-parallel converter 209, a guard-interval remover 210, an FFT part 211, a receive MIMO processing part 212, a demodulator 213, a deinterleaver 214, a parallel-to-serial converter 216, and an error correction part 215.

At the time of sending, a data inputted from the MAC part 11 is outputted to the RF part 30 after being encoded (202, 203), interleaved (204), MIMO processed in the transmission MIMO processing part 205, and OFDM modulated (206 to 208). At the time of receiving, a receive signal inputted from the RF part 30 is demodulated and outputted to the MAC part 11. Blocks 206-208 have the function to OFDM modulate, and blocks 209-211 have the function to demodulate an OFDM signal.

During eigen-mode transmission, a CSI from a sending side to a receiving side is obtained from the receiving side in advance before sending data, and based on a transmission vector obtained by singular value decomposing the CSI the MIMO processing is carried out in the transmission MIMO processing part 205.

In the RF part 30, at the time of sending, a signal inputted from the baseband part 21 is up-converted to a high frequency signal and outputted to the antenna 40. At the time of receiving, a receive signal inputted from the antenna 40 is down-converted and outputted to the baseband part 21. The antenna 40 emits a signal inputted from the RF part 30 into space and outputs a receive signal to the RF part 30.

The MIMO transmission like in the above-described configuration allows for simultaneous transmission of a plurality of streams. As a resend method, there is disclosed a method, wherein after being divided into segments, an error detection code is added to each segment, which is then sent, and at a receiving side the error detection code added to each segment is checked, thereby allowing the presence of an error for each segment to be checked and carrying out the resend in the unit of the segment (see JP-A-2002-538711).

SUMMARY OF THE INVENTION

Conventionally, an error detection code is added to the end of a frame, and whether a frame could be received correctly or not is checked at a receiving side, and if an error exists, then a resend request is carried out from the receiving side to a sending side. At this time, the presence of an error in a frame may be detected because an error detection code FCS is added to the end of the frame, however, because a place where the error occurred is not determined, the whole of the same frame needs to be sent again at the time of resending. Especially when the data size is large, resending of all the data causes a problem that the efficiency decreases.

The present invention has been made in view of such a point and is intended to provide a MIMO wireless transmission system for efficiently carrying out a resend that is carried out when an error occurred in a receive data due to fluctuations in the conditions of communication channels, the noises of a receiver, and other interferences.

In order to solve the above-described problem, a MIMO data transmission system of the present invention comprises a first wireless device that sends a data using MIMO, and a second wireless device that receives the data, wherein the first wireless device comprises a means for dividing all of or a part of a send data into a plurality of subframes, a means for adding an error detection code to each of the subframes, a means for resending a subframe having an error, the subframe being notified from the second wireless device that received the send data, and wherein the second wireless device comprises a means for detecting an error of the respective subframes sent from the first wireless device, and a means for notifying the first wireless device of an identifier identifying a subframe in which an error occurred.

As for other means for solving the above-described problem, a wireless data transmission device, which sends a data using MIMO, comprises a means for dividing a send data into a number equal to the number of MIMO transmission streams, and adding an error detection code for the each divided send data, and sending this as a MIMO transmission stream.

According to the present invention, when a resend occurred after sending a data, as compared with the conventional case where all the sent data are resent, the amount of resend data decreases because only a part of the send data, the part including a part where an error occurred, is resent. This allows the time spent sending data to be reduced.

Furthermore, because in the MIMO transmission a send data is divided into the number of streams and sent, an error detection code is added to each of the data that has been divided for each stream at the time of resending, and thereby when a resend occurred again, the amount of data to be resent again may be reduced further, so that the data transmission efficiency may be improved.

Furthermore, in the case where an eigen-mode transmission is used as the MIMO transmission method, when dividing a data into the number of streams to send, the respective data lengths differ because the modulation method and coding method of each stream differ depending on the conditions of communication channels between a sending side and a receiving side. In this case, the amount of data assigned to a stream with a small eigen value will decrease as compared with that of the other streams. Moreover, a transmission channel whose eigen value is small is characterized by that the amount of time fluctuation is large and unstable as compared with that of the other transmission channels, so that the transmission condition is most likely to differ from the one which a sending side assumed and thus an error is likely to occur. However, as an advantage of the present invention, the efficiency in resending may be improved because the error detection is carried out for each stream and therefore for a resend with respect to the most unstable transmission channel the amount of resend data will be reduced.

BRIEF DESCRIPTION OF THE DRAWINGS

FIG. 6 is a view showing a processing procedure of a send data.

FIG. 7 is a view showing a processing procedure of a receive data.

FIG. 9 is a view showing a resend procedure when a data error exists in one of subframes.

FIG. 12 is a view showing a processing procedure of a user terminal.

DESCRIPTION OF THE EMBODIMENT

[Embodiment 1 ]

Hereinafter, an embodiment of the present invention will be described using the drawings.

Figure 3:
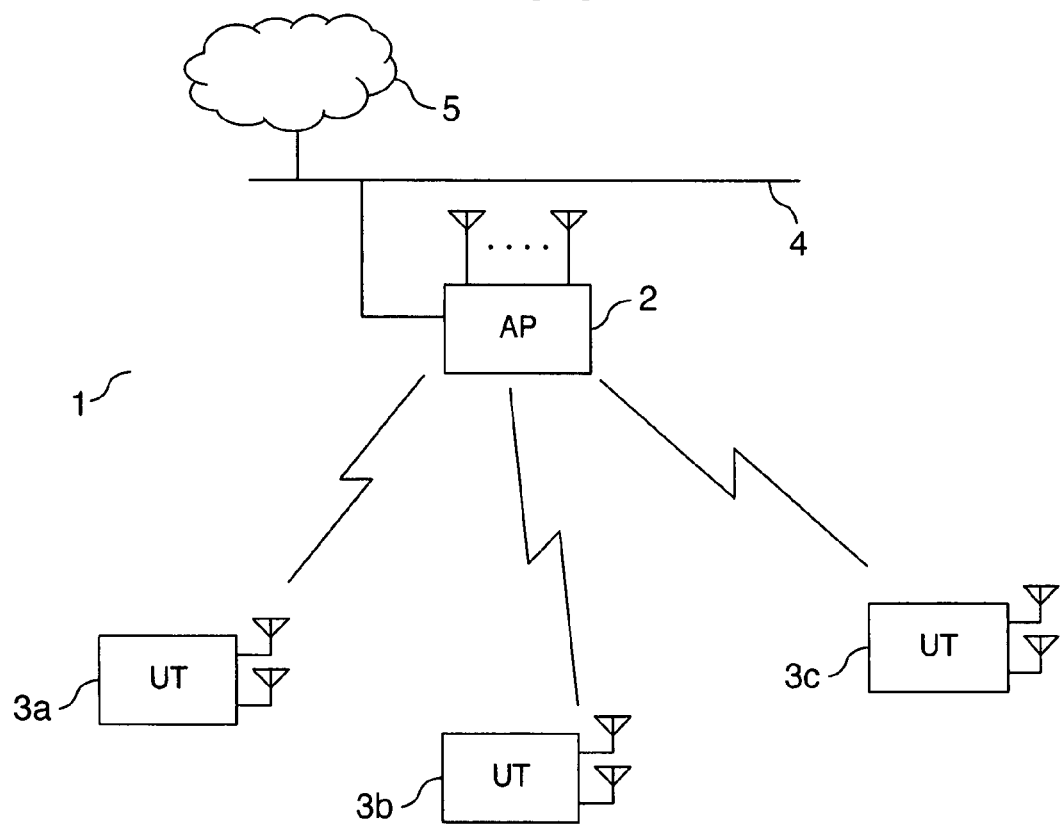
FIG. 3 is a view showing a MIMO data transmission system concerning the present invention.

Embodiment 1 is described. FIG. 3 shows a whole configuration of a MIMO data transmission system 1. This system 1 comprises an Access Point (AP) 2 and a plurality of User Terminals (UT) 3. AP 2 and UT 3 are provided with a plurality of antennas, respectively, and a MIMO transmission is carried out between AP 2 and UT 3. AP 2 is connected to a wired network 4 and is connected to the Internet 5 via the network 4.

Figure 4:
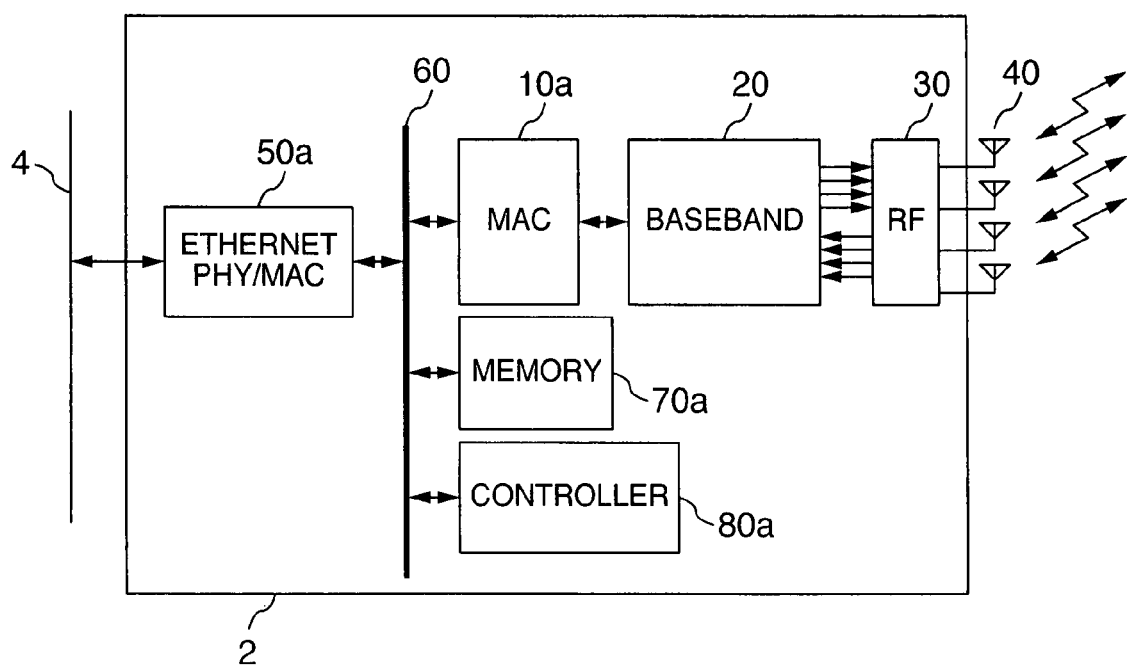
FIG. 4 is a view showing a configuration of an access point.

FIG. 4 shows a block configuration of AP 2. AP 2 comprises a Media Access Control (MAC) part 10*a*, a baseband part 20, a radio frequency part (RF) 30, an antenna 40, an Ethernet® physical layer/MAC layer interface 50*a*, a bus 60, a memory 70, and a controller 80*a*. The MAC part 10*a* controls the data exchange. The MAC part 10*a* of AP 2 carries out access control and transfers data to/from a plurality of UT 3 by time division. The details of the sending and receiving procedure of data will be described later.

The baseband part 20 has the function to carry out the encoding, modulation, MIMO processing, or the like of a data to send, under the control from the MAC part 10*a*, and output a transmission baseband signal to the RF part 30, and also has the function to carry out the MIMO processing, demodulation, and error correction processing of a receive baseband signal inputted from the RF part 30 and output this to the MAC part 10*a* as a receive data. The RF part 30 has the function to up-convert a transmission baseband signal, which is inputted from the baseband part 20, to a carrier frequency and output this to the antenna 40, and also has the function to down-convert a high frequency signal received at the antenna 40 and output this to the baseband part 20 as a receive baseband signal. The antenna 40 has the function to emit the high frequency signal inputted from the RF 30 into space, and the function to receive a signal that has transmitted through space and output this to the RF part 30. The Ethernet® physical layer/MAC layer interface 50*a* is an interface for connecting the wired network with AP 2. When UT 3 transmits a data to other device via the wired network 4, or when other device sends a data to UT 3 via the wired network 4, the data is once stored in a memory 70*a* and thereafter is outputted to the MAC part 10*a* or to the Ethernet® physical layer/MAC layer interface 50*a* via a bus 60 in accordance with the instructions of a controller 80*a*.

Figure 5:
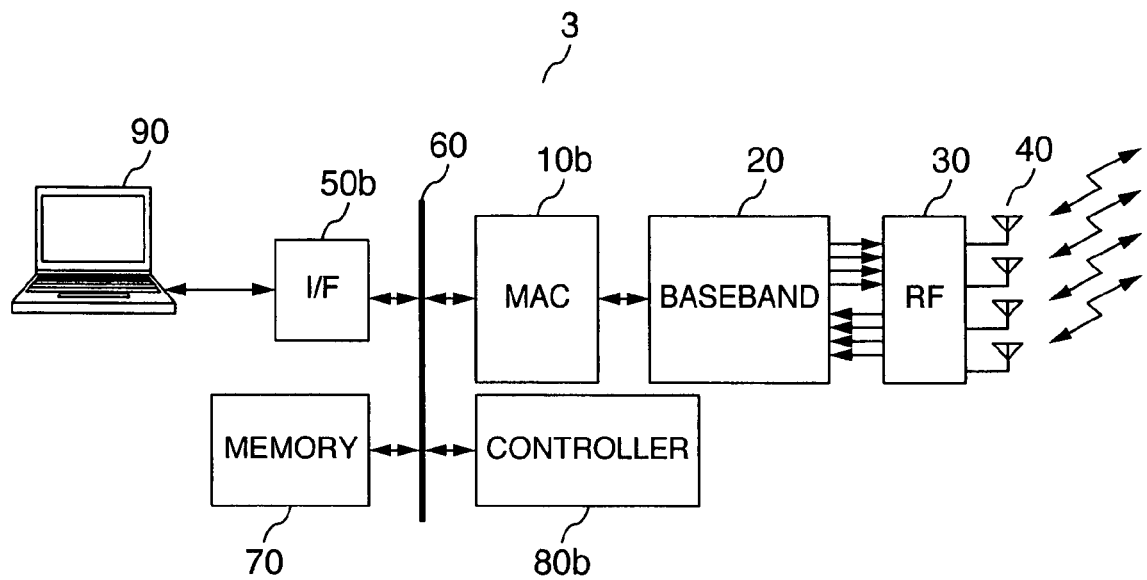
FIG. 5 is a view showing a configuration of a user terminal.

FIG. 5 shows a block configuration of UT 3. UT 3 comprises a MAC part 10*b*, the baseband part 20, the RF part 30, the antenna 40, an interface 50*b*, the bus 60, a memory 70, and a controller 80*b*, and is connected to an external device, such as a computer 90 or the like, via the interface 50*b*. Here, the baseband part 20, RF part 30, antenna 40, bus 60, and memory 70 have the same functions as those in AP 2, respectively. The MAC part 10*b* transfers data in accordance with a control frame from AP 2. A receive data is stored in the memory 70 and outputted to the computer 90 via I/F 50*b* under the control of the controller 80*b*.

Figure 1:
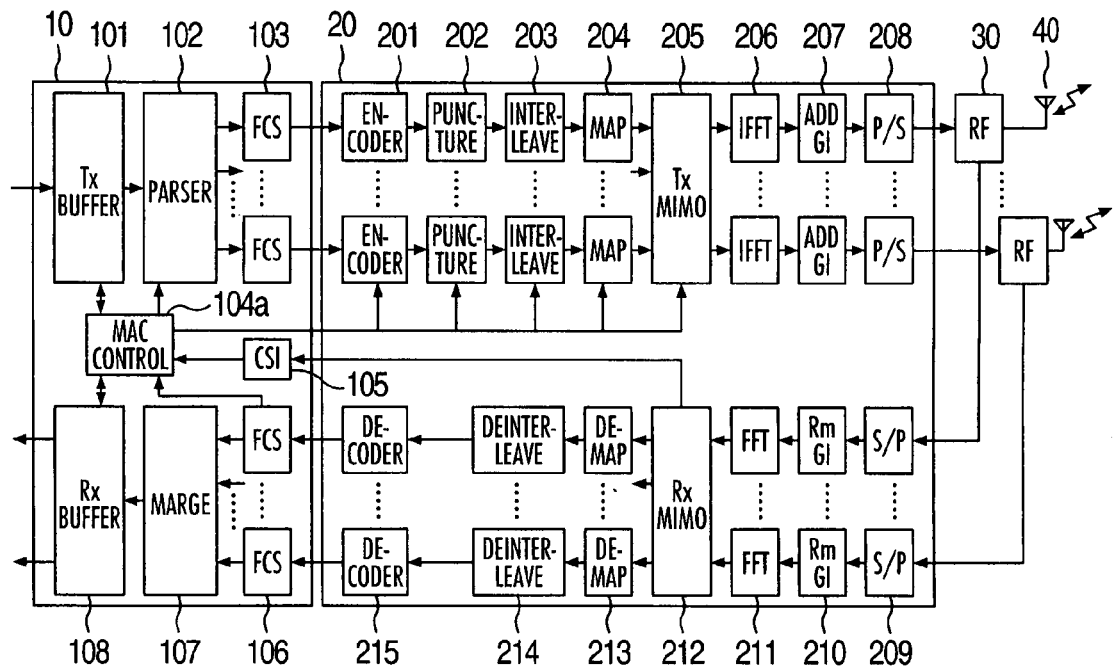
FIG. 1 is a view showing a configuration of a wireless device concerning the present invention.
Figure 2:
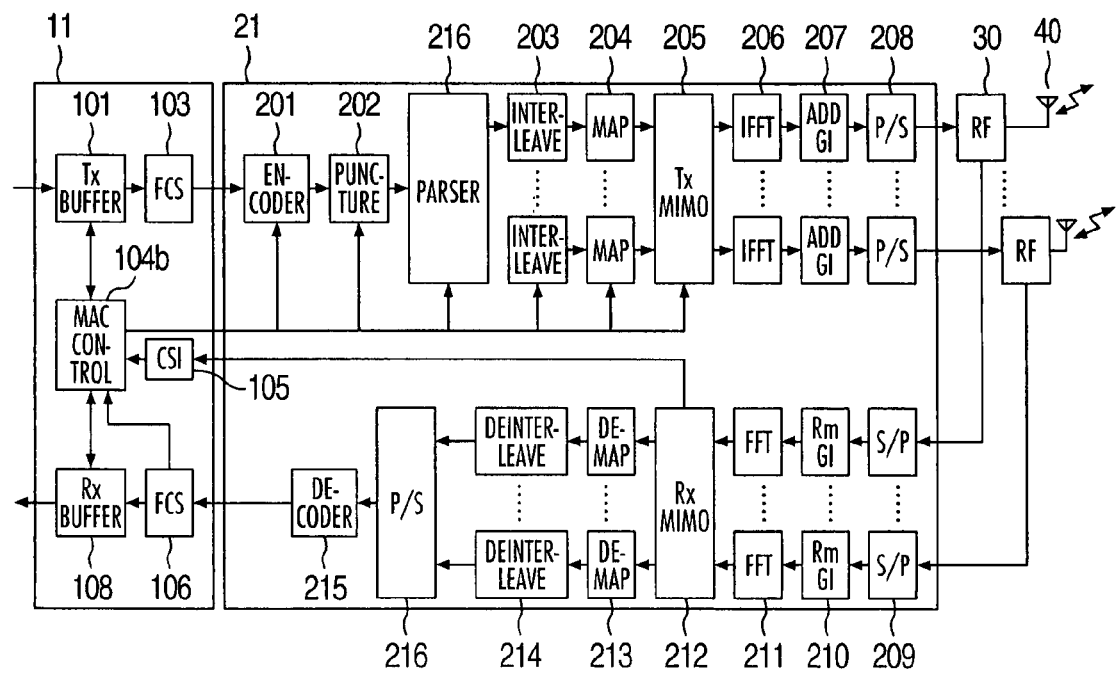
FIG. 2 is a view showing a configuration of a conventional wireless device.

The details of the configuration of the MAC part and baseband (BB) part of the AP and UT are described using FIG. 1. First, the operation at the time of sending is described. Although in the conventional technique an error detection code is added to the transmit buffer 101 and outputted to the baseband part 21 from the MAC part 11, here the data of the transmit buffer 101 is inputted to a parser 102, where the modulation method and coding rate of each of the transmission streams of a MAC controller 104a are determined based on CSI 105 so that the transmission efficiency becomes optimum. Based on this, the amount of data to be transmitted is determined for each stream, and according to this decision, the parser 102 divides the send data to output to an FCS part 103. In the baseband part 20, an encoder 201 exists corresponding to an output from the FCS part. As the data transmission rate increases, the processing of an error correction part 215 at the receiving side will not catch up with the rate, so that a plurality of encoder 201 at the sending side are provided corresponding to the number of the error correction parts 215.

At the time of receiving, the outputs of deinterleaver 214 are inputted to the error correction parts 215, respectively, thereby operating a plurality of error correction parts 215 simultaneously. The outputs of the error correction parts 215 are inputted to the FCS parts 106, and error detection is carried out for each of them.

This allows for the error detection of subframes that have been divided and sent for each stream of MIMO, and the FCS part 106 that detected an error will notify the MAC controller part 104a of in which subframe an error occurred. This allows the MAC controller part 104a to notify the sending side of a subframe in which an error occurred. At the sending side, by resending only a data corresponding to the subframe in which an error occurred, the subframe being notified from the receiving side, it is possible to resend the data without resending all the send data, thereby allowing the throughput to be improved.

Here, the details of the operation of MAC part 10 and baseband part 20 in this embodiment are described. FIG. 6 shows the processing procedure of a send data at the time of an eigen-mode transmission. The specifications of the system of this embodiment are shown in the following. Assume that AP 3 and UT 3 are provided with four transmitting and receiving antennas 40, respectively. Assume that the modulation method includes from BPSK wherein each symbol represents one bit to 64 QAM wherein each symbol represents 6 bits, as shown in Table 1. Moreover, assume that as the error correcting code a convolutional code is used, and that the coding rate includes four kinds as shown in Table 2.

TABLE 1

| # | Modulation | Bit/Symbol |
|---|---|---|
| 1 | BPSK | 1 |
| 2 | QPSK | 2 |
| 3 | 16QAM | 4 |
| 4 | 64QAM | 6 |

TABLE 2

| # | Coding Rate |
|---|---|
| 1 | 1/2 |
| 2 | 2/3 |
| 3 | 3/4 |
| 4 | 5/6 |

For this reason, the amount of data transmitted in the same symbol time varies depending on a combination of the modulation method and the encoding.

Because the number of antennas, i.e., the number of eigenmodes, is 4, a send data 300 stored in the transmit buffer 101 is divided into four parts at the parser 102 (301-1, 301-2, 301-3, 301-4). If an eigen-mode transmission is used at this time, the modulation method and coding rate may differ for each subframe, and therefore the above dividing is carried out so that the transmission time of each substream may be equal. For example, assume that for the substream 301-1 the modulation method is set to 64 QAM with the coding rate of 3/4, for the substream 301-2 the modulation method is set to 16 QAM with the coding rate of 3/4, for the substream 301-3 the modulation method is set to QPSK with the coding rate of 1/2, and for the substream 301-4 the modulation method is set to BPSK with the coding rate of 1/2, then the send data is divided so that the ratio of the respective substreams may be 9:6:2:1. If 9 bits are inputted as 64 QAM with a coding rate of 3/4, the 9 bits are turned into 12 bits by encoding and then the 12 bits are 64 QAM modulated to be a signal of two symbols. Similarly for other cases, the inputting of 6 bits, 2 bits, and 1 bit results in a signal of two symbols, respectively, so that the transmission time of each subframe becomes equal. Furthermore, a subframe header is added to the head of the data 301 that was divided in the parser part. The subframe header contains each subframe length and an offset value of a data starting point from the head of a send data. Moreover, an error detection FCS of each data 301 is added to the end of the data 301 at the FCS part 103. This is defined as a subframe. When sending by wireless after the MIMO processing, a header indicative of information on the whole transmission frame is added for sending (303-1, 303-2, 303-3, 303-4).

FIG. 7 shows a processing procedure of a receive data at the time of an eigen-mode transmission. A receive signal is divided into respective subframes (304-1, 304-2, 304-3, 304-4) by a receive MIMO processing by a MIMO receive processing part 212. The presence of an error in each subframe is checked at the FCS part 106, and as for the data of a subframe that does not have an error, the subframe header and FCS are removed and the resulting data is combined as the original data at a merge part 107, and then is stored in the receive buffer 108. Here, a case is shown in which all the subframes could be received without error.

Figure 8:
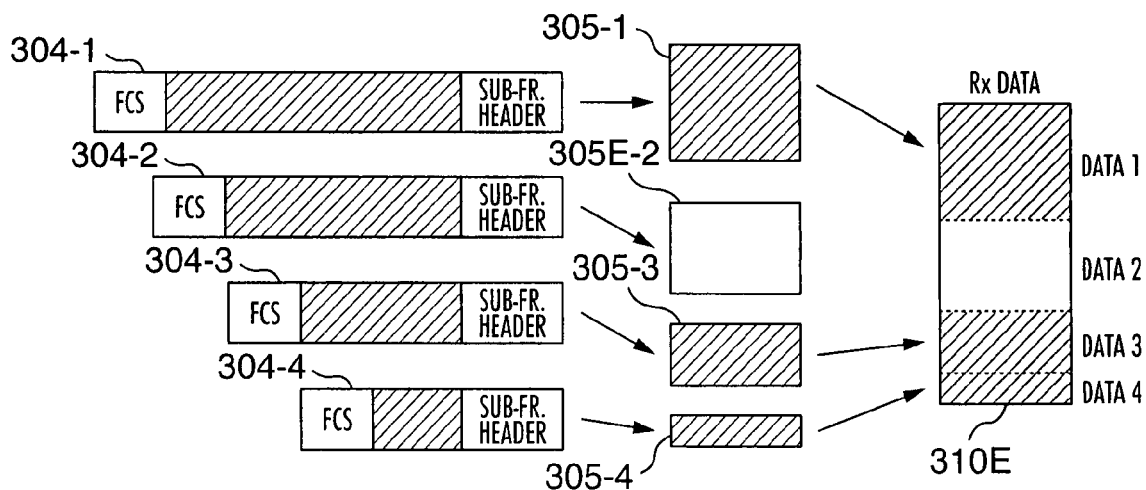
FIG. 8 is a view showing a processing procedure when a data error exists in one of subframes.

FIG. 8 shows a processing procedure when a data error exists in one of subframes. At the time of receiving four subframes as with FIG. 7, the FCS part 106 detected an error in the subframe 304-2, so that the part corresponding to a data 305-2 in the subframe of the receive buffer 108 is blanked. Because the subframe header contains each subframe length and an offset value of a data starting point from the head of a send data, when a subframe in the middle of the divided send data is lost and when combining the subframes as the original data in the merge part 107, it is possible to determine which position of data of the send data other subframes belong to. Moreover, at the same time, the MAC controller 104a may determine in which part of subframe an error occurred in the original data of the subframe, in which an error occurred.

FIG. 9 shows a resend procedure when a data error exists in one of subframes. As shown in FIG. 8, because the subframe 305-2 failed, a data corresponding to the subframe 305-2 in the transmit buffer 101 is resent. The parser 102 obtains the resend data from the transmit buffer 101 based on an information indicative of a position, in which an error occurred, in the send data, the information being notified by the MAC controller 104a, and decomposes the resend data into four parts (301a-1, 301a-2, 301a-3, 301a-4) based on an information on the modulation method and coding rate of each substream of the transmission, the information being notified similarly by the MAC controller 104a. Subsequently, by carrying out the same processings as the operations described using FIG. 7 and FIG. 8, the send data may be transmitted without error.

An access control by polling is carried out in this system. AP 2 inquires a plurality of UT 3 of the presence of a send data in a sequential order, and if a send data exists in UT 3, UT 3 sends this data. After receiving the send data from UT 3, or after receiving a notice of no send data, if there is a send data from AP 2 to UT 3, this data is sent to UT 3. Table 3 shows the types of frames used in this embodiment.

TABLE 3

| # | Frame Type |
|---|---|
| 1 | Data Request (400) |
| 2 | No Data (401) |
| 3 | Data (402) |
| 4 | ACK (403) |
| 5 | ACK + Data (404) |

The frame types include five types, "Data Request", "No Data", "Data", "ACK", and "ACK+DATA." The "Data Request" frame is a frame, which AP 2 sends to UT 3 and has a meaning that AP 2 inquires UT 3 of the presence of a send data. UT 3 sends a data using the "Data" frame described later if a send data exists. Moreover, if there is no send data in UT 3, UT 3 sends the "No Data" frame described later. Control frames other than the above-described "Data" frame and "ACK+DATA" frame may not be divided into subframes of the present invention, to send. This is generally because control frames, such as "Data Request", "No Data", and "ACK", have extremely small amount of data and the overhead caused by substreaming will increase.

The "Data" frame is a frame used when AP 2 and UT 3 send a data, respectively. UT 3 sends a data using the "Data" frame upon receipt of a "Data Request" frame from AP 2. AP 2 may send a send data to UT 3 at any timing.

The "ACK" frame is used, after receiving the "Data" frame, in order to notify the presence of an error in a receive data and the number of an erroneous subframe if there is an error. The sending side receives the "ACK" frame, and completes the transmission of a data if there is no error, and resends the data of a notified subframe if there is an error.

The "ACK+DATA" frame is a frame, which is sent from AP 2 to UT 3, and is used when sending the ACK and data simultaneously if AP 2 received a data from UT 3 and if there is no error in the receive data and AP 2 has a send data to UT 3.

Figure 10:
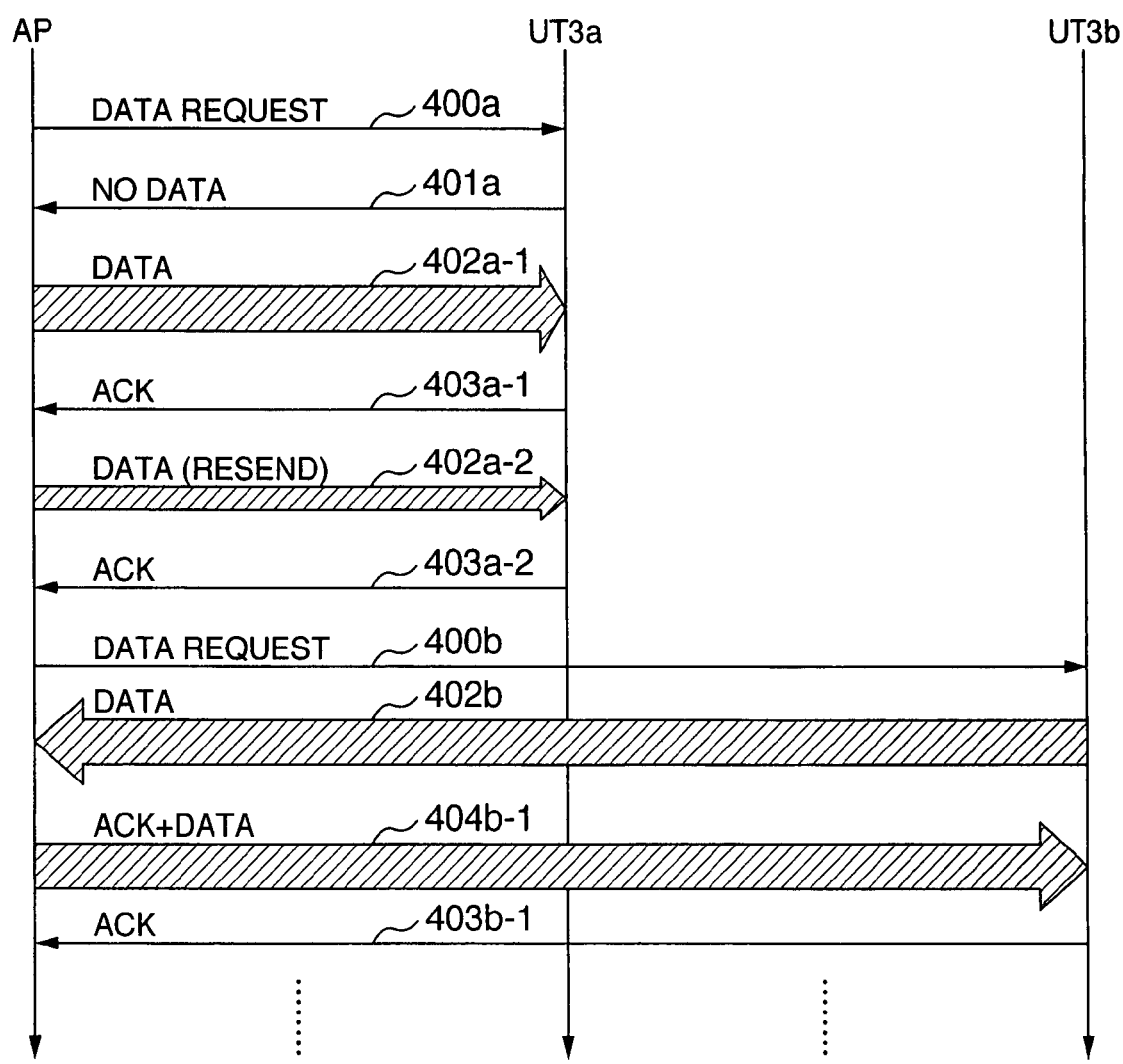
FIG. 10 is a view showing a communication procedure between an access point and a plurality of user terminals.

With the use of the above-described frames, the procedure of communications between AP 2 and a plurality of UT 3 is shown using FIG. 10. Here, for simplicity of description, assume that two UT 3 (UT 3a and UT 3b) exist with respect to an AP 2. A case is shown as an example in which, AP 2 has a data to send to each of UT 3a and UT 3b, and UT 3a does not have a send data but UT 3b has a send data. Moreover, there is shown an operation in the case where a frame error occurred once when UT 3a receives a data from AP 2.

AP 2 sends a "Data Request" frame 400a to UT 3a. UT 3a sends a "No Data" frame 401a because it does not have a send data. Because AP 2 has a send data to UT 3a, it sends a "Data" frame 402a-1 using an eigen-mode transmission method based on a CSI in the received "No Data" frame. Because there is an error in the received "Data" frame 402a-1, UT 3a specifies the number of a subframe, in which an error occurred, using an "ACK" frame 403a-1. AP 2 that received the "ACK" frame 403a-1 resends the corresponding part of the transmission from the send data, as a "Data" frame 402a-2. UT 3a that received the "Data" frame 402a-2 without error notifies by an "ACK" frame 403a-2 that it could receive without error. Now, AP 2 terminated the control of UT 3a and starts the control of UT 3b that is the next UT 3. As with UT 3a, AP 2 sends a "Data Request" frame 400b to UT 3b. Because UT 3b that received the "Data Request" frame 400b has a send data, it sends a data to AP 2 using a "Data" frame 402b. AP 2 that received the "Data" frame 402b without error notifies UT 3b of the fact that there was no error. Here, because AP 2 has a send data to UT 3b, it carries out the data transmission from AP 2 to UT 3b as well as the notification of ACK, simultaneously, using an "ACK+DATA" frame 404b-1. UT 3b that received the data without error sends to AP 2, which is the sending side, the fact that it could receive without error, using an "ACK" frame 403b-1. Hereinafter, the data communication between AP 2 and UT 3 is carried out under the control of AP 2. In the foregoing there has been shown the communication procedure between AP 2 and UT 3.

Hereinafter, each operation of AP 2 and UT 3 is described using flowcharts of FIG. 11 and FIG. 12.

AP 2 carries out communication with a plurality of UT 3 sequentially by polling.

Figure 11:
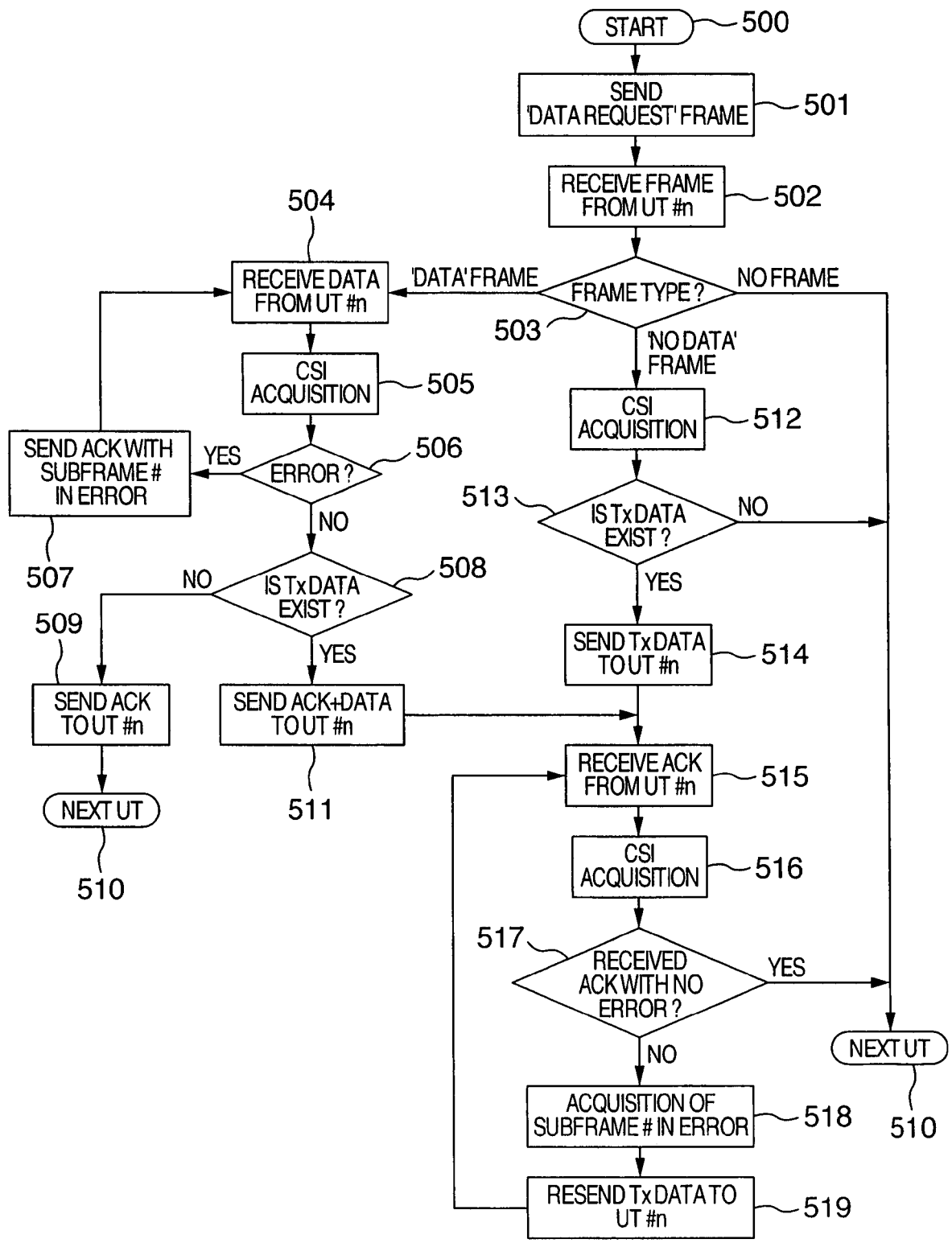
FIG. 11 is a view showing a processing procedure of an access point.

FIG. 11 shows the operation of AP 2 with respect to the respective UT 3. First, a "Data Requenst" frame 400 is sent to UT 3 with which a communication is carried out (501). A reply to the "Data Request" frame 400 returns from UT 3 (502). Here, the type of a frame in the reply is identified (503). Three types, a receipt of a "Data" frame, a receipt of a "No Data" frame, and no receipt, are conceivable.

The operation when having received a "Data" frame is shown (504). A CSI is obtained upon receipt of the "Data" frame (505). Moreover, error detection of each subframe in the receive frame is carried out to check the presence of an error (506). If there was an error, the number of an erroneous subframe is notified to UT 3 using an "ACK" frame. Because a data is sent again from UT 3, AP 2 receives this data (504) and will notify UT 3 of the number of an erroneous subframe until the error is gone within a predetermined number of times (507). If the data could be received without error, the fact that the data was received without error is notified to UT 3 using an "ACK+DATA" frame if there is a send data (511), and using an "ACK" frame if there is no send data (509). If the "ACK+DATA" frame is used, the data is also sent simultaneously, so that the flow enters the sequence of receiving ACK from UT 3. The details will be described later.

Next, the operation when having received a "No Data" frame in State 503 is described. Because a data from UT 3 does not exist, only a CSI is obtained here (512). Subsequently, the presence of a send data from AP 2 to UT 3 is checked (513), and if there is no send data, the flow changes to the process of next UT 3 (510). If there is a send data, the data is sent by an eigen-mode transmission based on the obtained CSI (514). After sending the data, the flow changes to the sequence of receiving ACK from UT 3. Here, also after sending an "ACK+DATA" frame, the flow changes to this sequence in the same way. After sending the data, an "ACK" frame from UT 3 is received (515). At this time, from the "ACK" frame to receive, a CSI is obtained (516). If in the received "ACK" frame there is a notice of the fact that an error occurred (517), the number of a subframe in which an error occurred is obtained (518), and the data will be sent by an eigen-mode transmission based on the CSI of when the data was obtained (519). If within the predetermined number of times, the above-described resend processing will be carried out until a notice that the data could be received without error comes from UT 3. If the notice that the data could be received without error came from UT 3, the flow changes to the process of next UT 3 (510).

If nothing has been receives in State 503, the flow changes to the process of next UT 3 (510).

Next, FIG. 12 shows the operation of UT 3.

UT 3 may send a data upon receipt of a "Data Request" frame from AP 2. The data transmission from AP 2 to UT 3 may be carried out at any timing. Here, suppose that the access control is carried out as the following procedure: AP 2 inquires UT 3 of the presence of a send data, and if there is a send data, the data is sent from UT 3, first, and then a data is sent from AP 2 to UT 3.

UT 3 always stands by in a receiving condition and continues to wait for a "Data Request" frame or a "Data" frame addressed from AP 2 to the local station (601).

If the "Data Request" frame is received, a CSI is obtained first (602) and the presence of a send data is checked (603). If there is a send data, the data is sent to AP 2 by an eigen-mode transmission based on the obtained CSI (604). States 605-609 are the states for carrying out a resend control, and the same operations as those of States 515-519 described above are carried out. Eventually, an ACK of notifying that the data could be transmitted without error will be carried out. At this time, if AP 2, which is the sending side of the ACK, has a send data to UT 3, an "ACK+DATA" frame is sent. For this reason, UT 3 needs to determine whether it received an "ACK" frame or it received an "ACK+DATA" frame (612). If a data is contained, the flow changes to State 613 and the resend control of States 613-616 is carried out. States 613-616 carry out the same operations as those of States 504, 506, 507, 508, 509 described above, respectively, and eventually a data is received without error, and an "ACK" frame is sent to AP 2 (616). Again, after completing the transmission of a data, the flow changes to State 601 to wait for receiving a frame addressed to the local station.

If there is no send data in State 603, a "No Data" frame is sent to AP 2, and a "Data" frame sent from AP 2 is received. If there is no "Data" frame, neither AP 2 nor UT 3 has no data to send, so that again the flow changes to State 601 to wait for receiving a frame addressed to the local station.

With the configuration and functions shown in the foregoing, at a sending side, by resending only a data corresponding to a subframe in which an error occurred, the subframe being notified from a receiving side, the data may be resent without resending all the send data, so that the throughput may be improved.

The present invention is suitable for use in a transceiver of system in which wireless communication is carried out using a plurality of antennas in sending and receiving, respectively.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A MIMO wireless data transmission system, in which a first wireless device sends a data using MIMO and a second wireless device receives the data, wherein the first wireless device divides all of or a part of a send data into a plurality of subframes, adds an error detection code to each of the subframes, sends each of the subframes using a stream of an eigen-mode transmission, and resends a subframe having an error of the send data, the subframe being notified from the second wireless device that received the send data, and wherein the second wireless device detects an error of the respective subframes sent from the first wireless device, and notifies the first wireless device of a subframe in which an error occurred.

2. The MIMO wireless data transmission system according to claim 1, wherein with the use of an eigen-mode transmission as a transmission from the first wireless device to the second wireless device, the first wireless device determines a modulation method and coding rate with respect to each of streams of the eigen-mode transmission based on a channel state information between the second wireless device, and comprises dividing all of or a part of a send data into a plurality of subframes based on the modulation method and coding rate.

3. The MIMO wireless data transmission system according to claim 2, wherein in a method for dividing all of or a part of a send data of the first wireless device into a plurality of subframes based on a modulation method and coding rate, the dividing into the subframes is carried out so that a symbol time after modulation and encoding is equal.

4. The MIMO wireless data transmission system according to claim 2, wherein the first wireless device comprises a means for dividing a data of a subframe in which an error occurred, the subframe being notified from the second wireless device, further into substreams to send.

5. The MIMO wireless data transmission system according to claim 1, wherein in a method for dividing all of or a part of a send data of the first wireless device into a plurality of subframes (based on a modulation method and coding rate, the dividing into the subframes is carried out so that a symbol time after modulation and encoding is equal.

6. The MIMO wireless data transmission system according to claim 5, wherein the first wireless device comprises a means for dividing a data of a subframe in which an error occurred, the subframe being notified from the second wireless device, further into substreams to send.

7. The MIMO wireless data transmission system according to claim 1, wherein the first wireless device comprises a means for dividing a data of a subframe in which an error occurred, the subframe being notified from the second wireless device, further into substreams to send.

8. A wireless data transmission device that sends a data using MIMO, comprising: a parser that divides a send data into subframes of a number equal to the number of transmission streams of MIMO; an Frame Check Sequence (FCS) adding part that adds an error detection code for the each subframe; and a MIMO processing part that carries out a MIMO processing for sending the subframes by the transmission streams of MIMO, respectively.

9. The MIMO wireless data transmission device according to claim 8, further comprising an error correction encoder that carries out an error correction coding for each subframe to which an error detection code is added.

10. The MIMO wireless data transmission device according to claim 8, wherein the parser comprises a means for determining a modulation method and coding rate with respect to each of the streams of an eigen-mode transmission based on a channel state information between a second wireless data transmission device, and divides all of or a part of the send data into a plurality of subframes based on the modulation method and coding rate.

11. The MIMO wireless data transmission device according to claim 8, wherein the parser divides all of or a part of the send data into the subframes so that a symbol time after modulation and encoding is equal.

12. The MIMO wireless data transmission device according to claim 8, wherein when a resend request for either one of the subframes is received from a radio station that received the receive data, the parser further divides a data of the subframe into substreams for resending, the subframe being requested to be resent.

13. A MIMO wireless data receiver that receives a data, which is sent using MIMO, comprising: a MIMO receive processing part that divides a receive data into subframes divided for each transmission stream of MIMO; and an Frame Check Sequence (FCS) check part that carries out error detection of the receive data in the unit of the subframe, wherein when a receiving error is detected concerning either one of the subframes, a resend of the subframe is requested to a MIMO wireless data transmission device that is the sender of the receive data.

14. The MIMO wireless data receiver according to claim 13, further comprising an error correction encoder that carries out an error correction processing, in a preceding stage of the FCS check part.

15. A method for transmitting MIMO wireless data, comprising the steps of:

dividing at least a part of a send data into a plurality of subframes at a first wireless device;

adding an error detection code to each of the subframes at the first wireless device;

with the use of a stream of an eigen-mode transmission, sending each of the subframes by means of MIMO at the first wireless device;

receiving each of the subframes sent from the first wireless device, at a second wireless device;

detecting a respective error of the received subframes, at the second wireless device;

notifying a subframe, in which a detected error occurred, from the second wireless device to the first wireless device; and resending a subframe notified by the second receiver, at the first wireless device.

* * * * *